Sept. 3, 1929.                A. LANGSNER                 1,726,960
                              MEASURING TAPE
                           Filed Aug. 29, 1927
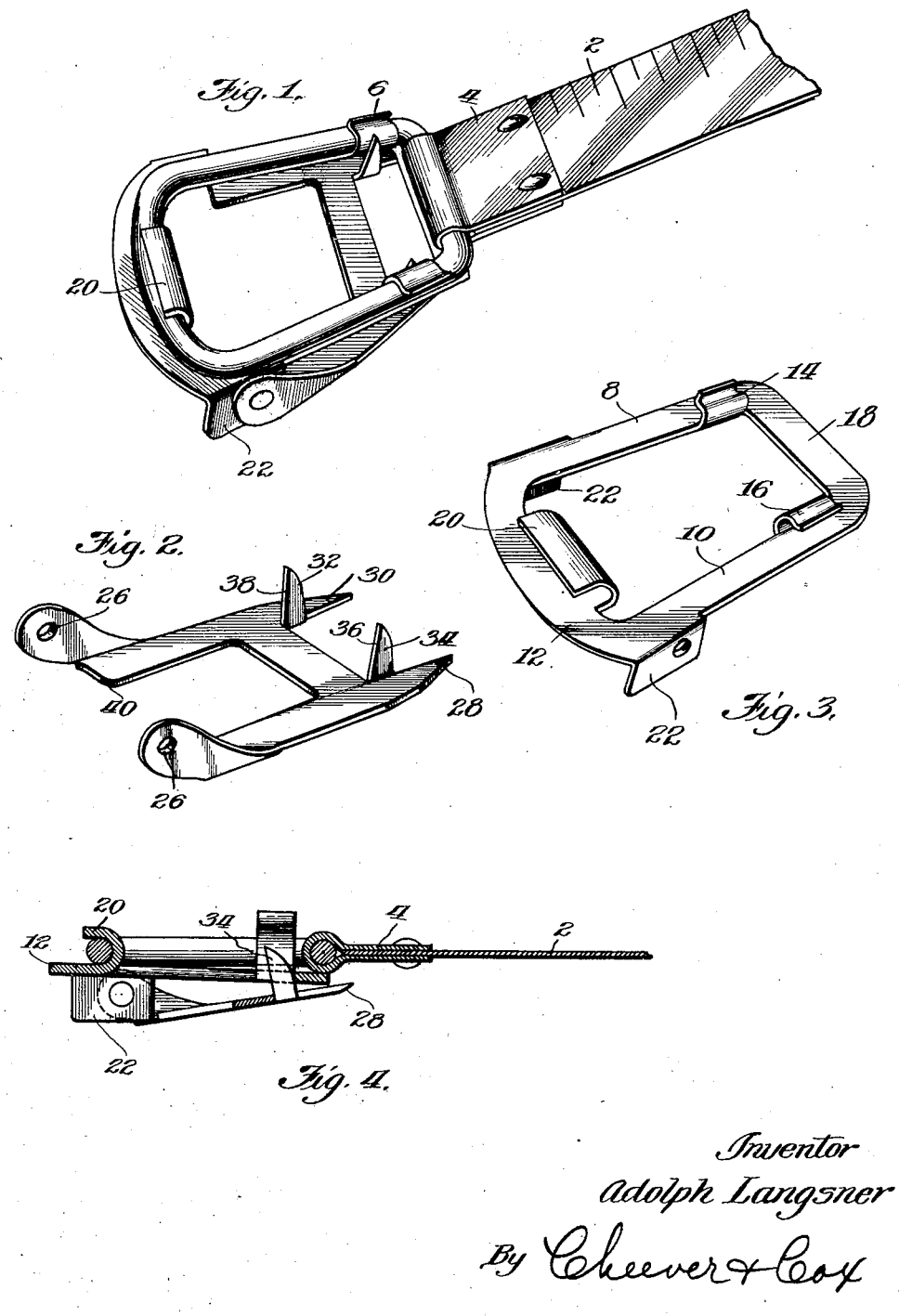
Inventor
Adolph Langsner
By Cheever & Cox
Attys.

Patented Sept. 3, 1929.

1,726,960

UNITED STATES PATENT OFFICE.

ADOLPH LANGSNER, OF CHICAGO, ILLINOIS, ASSIGNOR TO EUGENE DIETZGEN COMPANY, OF CHICAGO, ILLINOIS, A CORPORATION OF DELAWARE.

MEASURING TAPE.

Application filed August 29, 1927. Serial No. 216,307.

My invention relates to measuring tapes for the use of surveyors, mechanics, inspectors and others and is particularly concerned with an attachment of the terminal ring of the tape. When two persons cooperate in using a tape no difficulty is experienced in making measurements because one person can hold the end of the tape at the point where it should be while the other measures off the distance. But usually tapes are operated single-handed and then it becomes important to provide means for holding the free end of the tape in place while the operator measures out the distance or passes to the other end of the object to be measured.

One of the objects of my present invention is to provide an attachment which may be quickly, detachably connected to or detached from the terminal end of a measuring tape and which attachment carries an anchor for holding the end of the tape so that the measurement can be taken irrespective of the nature of the surface measured.

Another object of my invention resides in providing an attachment in the nature of a spring clip which may be quickly snapped upon the terminal ring of the measuring tape to hold the anchor operably associated with the terminal ring.

Still another object of my invention resides in providing such an attachment wherein the clip portion thereof is formed of sheet metal and is provided with integral resilient flanges or ears adapted detachably and yieldably and frictionally to engage the terminal ring and in a manner prevent it from inadvertently disengaging from the ring.

These and other objects of my invention will be apparent from a perusal of the following specification when taken in connection with the accompanying drawings wherein—

Fig. 1 is a perspective view of my improved attachment assembled upon the terminal ring of a tape.

Fig. 2 is a perspective view of the anchor.

Fig. 3 is a perspective view of the clip portion of my attachment and Fig. 4 is a sectional view taken longitudinally thru Fig. 1.

Referring now to the drawings in detail my invention takes the form of an attachment adapted to be quickly and easily attached to the terminal ring of a tape but which will not become disengaged therefrom unless forcibly and purposely detached. In general the attachment comprises a preferably sheet metal clip pivotally carrying an anchor and clip and also carrying means such as integral spring ears or flanges for snapping onto the ring.

Referring now to the drawings in detail, the measuring tape 2 which is preferably of metal has rigid thereto by means of cheeks 4, the section terminal ring 6 which is of slightly tapered formation as is well known in the art. My invention comprises an attachment for this standard measuring tape so that any such measuring tape now on the market may be readily provided with an anchor without modifying the tape or the terminal ring. In the present embodiment of my invention, the attachment preferably comprises a clip formed of sheet metal. This clip is preferably in the form of a hollow rectangle, the sides of the rectangle being in a measure tapered to correspond with the tapered sides of the terminal ring 6. These tapered sides are designated by the reference numerals 8 and 10 and when the clip is assembled onto the terminal ring 6, these sides register with the corresponding sides of the ring.

The outer end 12 of the clip is curved slightly to correspond with the slight curvature of the outer end of the terminal ring 6. This clip is preferably formed of sheet metal and is provided with integral laterally extending, slightly resilient or yieldable clamping ears or flanges for detachably yet firmly holding the clip securely to the terminal ring 6. As clearly shown in Fig. 3 of the drawings, two of these resilient ears 14 and 16, are located in opposed relation near the end 18 of the clip, preferably at the corner thereof. The third ear 20, is integral with the curved end 12 of the clip and is formed considerably longer. In addition it is formed as rather U-shaped in cross section so as to engage over and clip the outer end of the terminal ring. In addition the clip is provided with integral ears 22 which extend in a direction reverse to that of the ears 14, 16 and 20. These ears 22 are perforated to receive a fastening pin which passes thru a pair of ears 26 on the anchor so that the anchor is pivotally mounted on the clip.

While the anchor may be of any desired construction I preferably form it of H-shaped formation. This type of clip is illustrated and claimed in my prior application Serial No. 108,471 filed May 12, 1926. It is to be understood that the anchor is merely illustrative of one type which may be used with my present attachment. The anchor herein shown is formed of sheet metal and is provided with two pointed legs 28 and 30, adapted to be stuck into the ground or into a wooden floor or the like. The inner portions of these legs are provided with correspondingly located and opposed laterally extended prongs 32 and 34 which have vertical faces 36 and 38 for a purpose hereinafter made evident. In addition these prongs are formed so that they have some resiliency. The opposite portions of the anchor are formed with stop shoulders 40 adapted to abut the outer edge of the ears 22 when the anchor is swung to open position. It will be understood that the anchor as thus formed is constructed and arranged to take hold of the flat surface in the plane in which the measurement is to be taken, as for instance in the case of a floor, the anchor by means of the pointed legs which will stick into the floor so as to hold the tape and anchor at the point where it is placed and the legs may be driven into the wooden floor or the ground; in addition, the anchor is constructed so that it will securely hold the end of the tape, conterminous with the end of the object being measured, in which case the anchor is open to 90° position and will engage the end of the board for holding the free end of the tape in place. In addition the anchor may be driven into the end of the board by means of the prongs 34 or will take under the board or under a metal plate the front surfaces 36 and 38 clipping the end of the board so that the ring will not ride up under such end; finally the anchor is constructed so that it may be folded or swung into the plane of the clip and when thus folded the resilient prongs 32 and 34 will frictionally contact and clip the inner curved surfaces of the ears 14 and 16 of the clip which will serve to hold the anchor in such folded position.

From perusal of the foregoing description it may be readily seen that when my attachment is connected to a terminal ring of a tape the sheet metal clip will overlie, or underlie, and be in registration with the terminal ring 6. In applying the clip the relatively long ear or flange 20 snapped over the outer end of the terminal ring and then the two shorter resilient ears 14 and 16 are snapped over the tapered walls at a point adjacent the opposite end of the terminal ring. It will be noted that since these clips when thus positioned will have their edges lying against the smaller end of the terminal ring adjacent the clip 4 and thus the clip cannot be slid from the terminal ring in a direction toward the tape. At the same time the flange 20 will prevent the clip moving in the opposite direction. The foregoing construction thus provides a very sturdy member which will firmly and yet detachably clip the terminal ring. This member or clip in turn provides a strong and rigid bearing to which the anchor itself is pivotally mounted and in addition provides a rigid stop, as by means of edges of the lateral ears 22, for limiting the outward swing of the anchor to the 90° position. Furthermore by reason of the integral construction of the ears 14 and 16 and the fact that they are rotated substantially at the corner and juncture of the two sides 8 and 10 and the end 18 of the clip, the edges of these ears 14 and 16 will provide a strong abutment for contacting with the smaller end of the terminal clip 6 and for resisting the pull on the tape measure during a measuring operation.

Having thus described my invention, what I claim as new and desire to secure by Letters Patent is:

1. An anchor carrying attachment for the terminal ring of a measuring tape comprising a clip having sides substantially registering with the sides of the terminal ring, the outer side of the clip having a curved ear embracing the outermost end of the terminal ring and holding the clip from movement in a direction away from the tape end of the terminal ring, the opposed sides of the clip having curved ears adapted to engage over the corresponding sides of the ring and constructed and arranged to prevent movement of the clip relative to the terminal ring in the reverse direction and an anchor pivotally mounted on the clip.

2. In a device of the class described the combination with a terminal ring of a measuring tape, a sheet metal clip therefor, of substantially hollow construction, two sides of the clip having a taper corresponding with that of the terminal ring and provided with laterally bent ears adapted to resiliently engage the tapered sides of the terminal ring, said ears being located on the clip so as to engage the smaller end of the end portion of the terminal ring and said clip having on its wider and outer end a substantially U-shaped integral flange adapted to overlie and engage the outer end of the terminal ring and an anchor pivotally mounted on said clip.

3. In a device of the class described, the combination of a tape measure having a tapered terminal ring, an attachment therefor comprising a clip having four sides forming a closed hollow member, substantially registering with the four sides of the terminal ring and a plurality of resilient ears carried by the sides of said clip for engaging over the sides of the terminal ring for preventing inadvertent disengagement of the clip from the ring and an anchor carried by said clip.

4. An attachment for the terminal ring of a measuring tape comprising a hollow substantially rectangular member of sheet metal, two sides of which taper from a longer end to a smaller end, said tapering sides having laterally extending integral clips located adjacent the smaller end and that end of the clip opposite the smaller end having a laterally extending terminal ring clipping portion and provided with opposed ears having an edge providing a stop, and an anchor pivoted at said ears said anchor being provided with spaced shoulders adapted to abut the stops of said ears when the anchor is swung to open position.

5. An attachment for the terminal ring of a measuring tape comprising a clip pivotally carrying an anchor, said clip having an ear adapted to be slid over one end of the terminal ring to overlie the same and said clip being provided with resilient ears adapted to snap over other portions of the terminal ring to hold the same in assembled position thereon.

6. An attachment for the terminal ring of a measuring tape comprising a device pivotally carrying an anchor, said device having a member adapted to pass over one end of the terminal ring and provided with resilient members adapted to snap over portions of the terminal ring to hold the same in assembled position thereon.

7. An attachment for the terminal ring of a measuring tape comprising a device pivotally carrying an anchor, said device having a plurality of means adapted to overlie portions of the terminal ring, certain of said means being resilient for purpose of frictionally gripping said terminal ring and whereby to provide means for detachably holding said device in assembled position on said ring.

In witness whereof, I have hereunto subscribed my name.

ADOLPH LANGSNER.